March 14, 1961 L. L. CERNY 2,974,356
CLAMP FOR FANTAIL SHRIMP DEVEINING AND DESHELLING APPARATUS
Filed June 4, 1957 11 Sheets-Sheet 1

INVENTOR.
LOUIS L. CERNY
BY
*Hyde, Meyer, Baldwin & Doran*
ATTORNEYS

Fig. 6

INVENTOR.
LOUIS L. CERNY
BY
Hyde, Meyer, Baldwin & Doran,
ATTORNEYS

March 14, 1961 L. L. CERNY 2,974,356
CLAMP FOR FANTAIL SHRIMP DEVEINING AND DESHELLING APPARATUS
Filed June 4, 1957 11 Sheets-Sheet 5

INVENTOR.
LOUIS L. CERNY
BY
Hyde, Meyer, Baldwin & Doran
ATTORNEYS

March 14, 1961 L. L. CERNY 2,974,356
CLAMP FOR FANTAIL SHRIMP DEVEINING AND DESHELLING APPARATUS
Filed June 4, 1957 11 Sheets-Sheet 6

INVENTOR.
LOUIS L. CERNY
BY
Hyde, Meyer, Baldwin & Doran
ATTORNEYS

March 14, 1961 L. L. CERNY 2,974,356
CLAMP FOR FANTAIL SHRIMP DEVEINING AND DESHELLING APPARATUS
Filed June 4, 1957 11 Sheets-Sheet 7

INVENTOR.
LOUIS L. CERNY
BY
Hyde, Meyer, Baldwin & Doran
ATTORNEYS

March 14, 1961 L. L. CERNY 2,974,356
CLAMP FOR FANTAIL SHRIMP DEVEINING AND DESHELLING APPARATUS
Filed June 4, 1957 11 Sheets-Sheet 9

INVENTOR.
LOUIS L. CERNY
BY
Hyde, Meyer, Baldwin & Doran
ATTORNEYS

March 14, 1961 L. L. CERNY 2,974,356
CLAMP FOR FANTAIL SHRIMP DEVEINING AND DESHELLING APPARATUS
Filed June 4, 1957 11 Sheets-Sheet 10

INVENTOR.
LOUIS L. CERNY
BY
Hyde, Meyer, Baldwin & Doran
ATTORNEYS

March 14, 1961 L. L. CERNY 2,974,356
CLAMP FOR FANTAIL SHRIMP DEVEINING AND DESHELLING APPARATUS
Filed June 4, 1957 11 Sheets-Sheet 11

INVENTOR.
LOUIS L. CERNY
BY
Hyde, Meyer, Baldwin & Doran
ATTORNEYS

United States Patent Office 2,974,356
Patented Mar. 14, 1961

2,974,356
CLAMP FOR FANTAIL SHRIMP DEVEINING AND DESHELLING APPARATUS

Louis L. Cerny, Cleveland, Ohio, assignor to The Alpha Shrimp Machine Corporation, Cleveland, Ohio, a corporation of Ohio Filed June 4, 1957, Ser. No. 663,381
4 Claims. (Cl. 17—2)

This invention relates to improvements in a machine for cutting through the entire shell along the length of a shrimp except for the tail and the shell section immediately adjacent thereto, and for thereafter removing the split sections of the shell whereby to process fantail shrimp which leaves the tail for use as a handle by the consumer when he eats the shrimp.

One of the objects of the present invention is to provide a machine wherein the operator places a raw shrimp in a clamp at a clamping station with the last knuckle (between the fifth and sixth shell sections) between cracking bars extending crosswise of the shrimp body and located on the upper and lower clamp jaws respectively, after which the clamp is automatically closed by the machine, causing the cracking bars to crack the last knuckle.

Another object of the present invention is to present a series of shrimps in clamping stations like that described above, with the dorsal side of the shrimp outwardly, to a horizontally acting saw which is so positioned and timed by the operation of the machine as to saw through the shell sections lengthwise of the shrimp, and approximately midway of the thickness of the shrimp, cutting all of the shell sections except the sixth section immediately next to the tail.

My improved machine provides means for controlling the depth of the saw cut into the dorsal side of the shrimp so that in preparing round fantail shrimp, the cut is just deep enough to remove the sand vein. My improvements also comprise a saw arrangement whereby the sand vein is simultaneously removed during the sawing operation.

My invention also provides means for sawing not only through the shell on the dorsal side of the shrimp, as mentioned above, but, in preparing butterfly fantail shrimp, the sawing through the meat of the shrimp to a position close to the ventral side but leaving a meat connection between the two halves of the shrimp so that, in cooking, the shrimp may be opened up in butterfly fashion as is well known.

My invention also includes improved rolls for stripping the slit portion of the shell from the shrimp. In order to aid in this operation, I have provided a special guard plate to hold the tail and the immediately adjacent shell section against any stripping action of the rolls. I have further improved the action of the stripping rolls by providing for the reciprocation of the above mentioned guard plate away from the end of the rolls after each shrimp is treated so as to clear any caught portions of meat or shell from the ends of the roll.

My invention also includes safety devices to protect certain parts of the machine against injury which might occur under certain operating conditions occasionally encountered.

Other objects and advantages of my invention will be apparent from the accompanying drawings and description, and the essential features will be set forth in the appended claims.

In the drawings—

Fig. 8 is a sectional view taken along the line 8—8 of Fig. 7;

Fig. 19 is a top plan view, enlarged, of a saw used in processing round fantail shrimp; while

My present invention is an improvement over a machine shown in Patent No. 2,683,281, granted July 13, 1954, to Albert B. Yanus and myself. This patented machine was for the preparation of cocktail shrimp where a cut is made along the entire dorsal side of the shrimp and the sand vein removed, after which the entire shell and tail is removed from the shrimp. This patented machine cannot be utilized in its patented condition for the production of fantail shrimp as disclosed herein.

Figure 1:
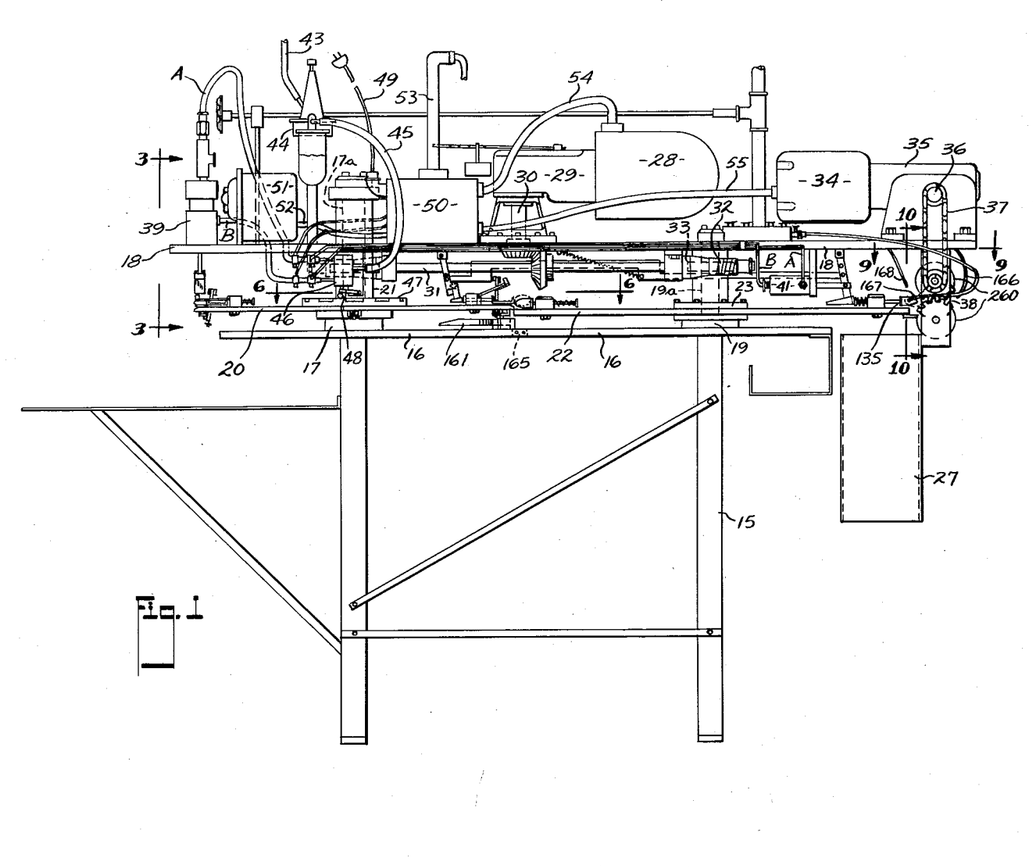
Fig. 1 is a side elevational view of my improved machine taken from one side thereof.
Figure 2:
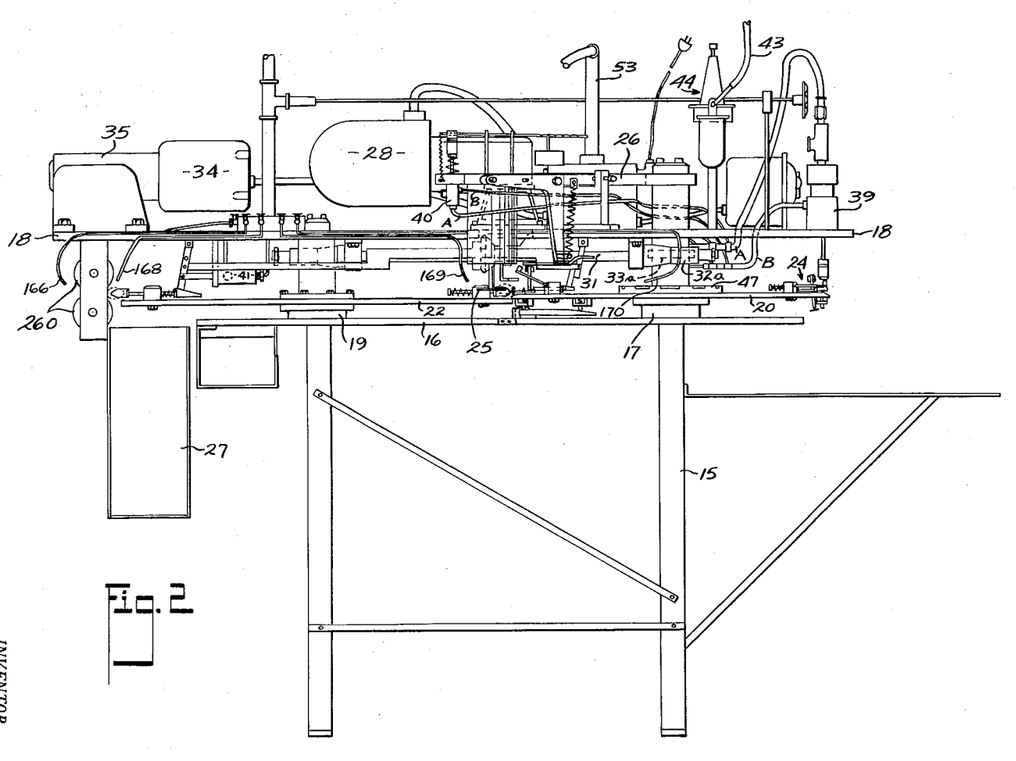
Fig. 2 is a side elevational view taken from the side opposite Fig. 1.
Figure 11:
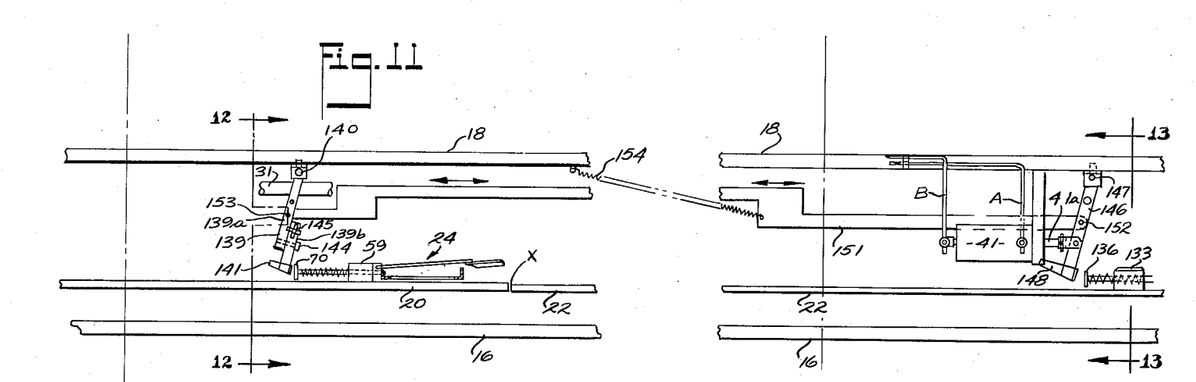
Fig. 11 is a somewhat diagrammatic view, enlarged, taken approximately diametrically through the two rotatable table conveyors and showing a connection between the pusher at the left which transfers a shrimp from the first table to the second table, and a pusher at the right which transfers a shrimp from the second table to the deshelling rolls.

Referring now to Figs. 1 and 2, a general description of the machine will be helpful in the understanding of the description of the details which follows later. Any suitable structure 15 is arranged to support the machine upon a floor or other working level. Secured to the top of this frame is a base plate 16 which forms a working table under the entire machine. Secured to the base 16 is an upstanding fixed post 17a, fastened by screws 17b, as clearly shown in Fig. 8. A bearing retainer sleeve is secured to table 20 and houses a table bearing (not shown) around the base of post 17a. This post has a shoulder on which rests the upper fixed base member 18. At the right hand side, another sleeve 19 surrounds an upwardly extending post 19a secured to base plate 16 in the same manner as 17a. Post 19a has a shoulder, not shown, on which the upper base member 18 rests. Thus, the upper base member 18 is fixed and parallel to the table 16. The first rotatable table conveyor 20 is generally circular in form and is permanently secured to a sleeve 21 (see Fig. 8) which snugly fits around the post 17a. A second rotatable table conveyor 22 is bolted to a sleeve 23 which snugly surrounds post 19a. The rotatable table 22 is generally circular in form and is arranged at one point X to be substantially tangent to the table 20. The table 20 is slightly higher than table 22 as seen in Fig. 11, although this is slightly exaggerated in Fig. 1.

Figures 3, 3A:
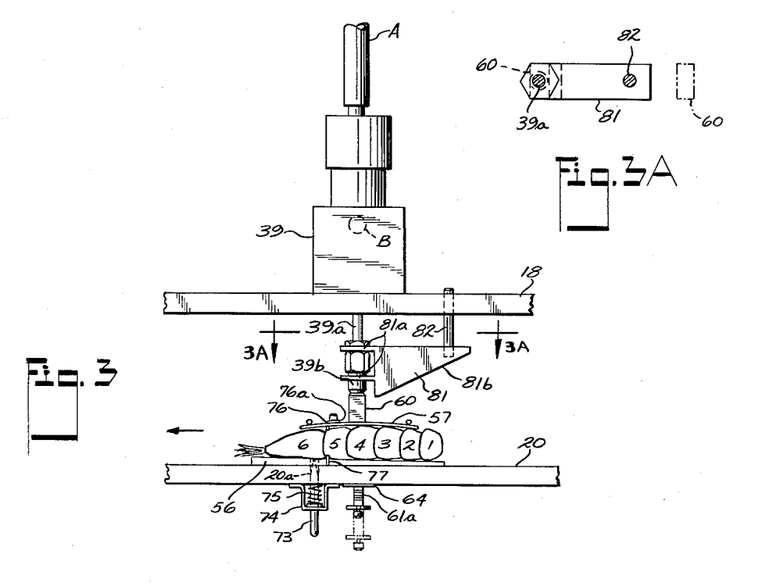
Fig. 3 is a fragmental end elevational view, enlarged, taken from the position of the line 3—3 of Fig. 1 and showing the body of a shrimp in position between the jaws of a clamp at the original loading station.
Fig. 3A is a fragmental top plan view taken along the line 3A—3A of Fig. 3.
Figure 4:
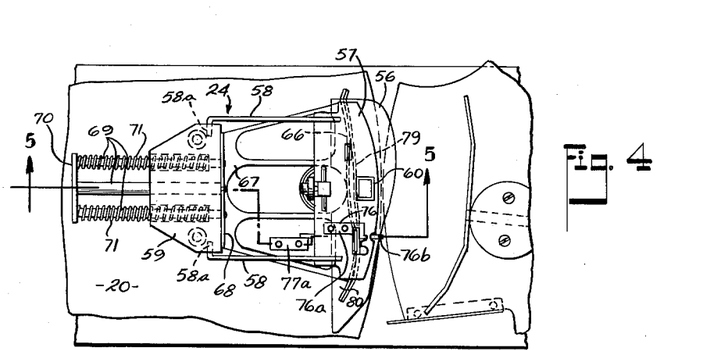
Fig. 4 is a top plan view, enlarged, of one of the shrimp clamps like that in Fig. 3, but the view is taken at a point of tangency between a first rotatable table conveyor where the shrimp shell is cut, and a second rotatable table conveyor which transfers the shrimp to the deshelling rollers.
Figure 6:
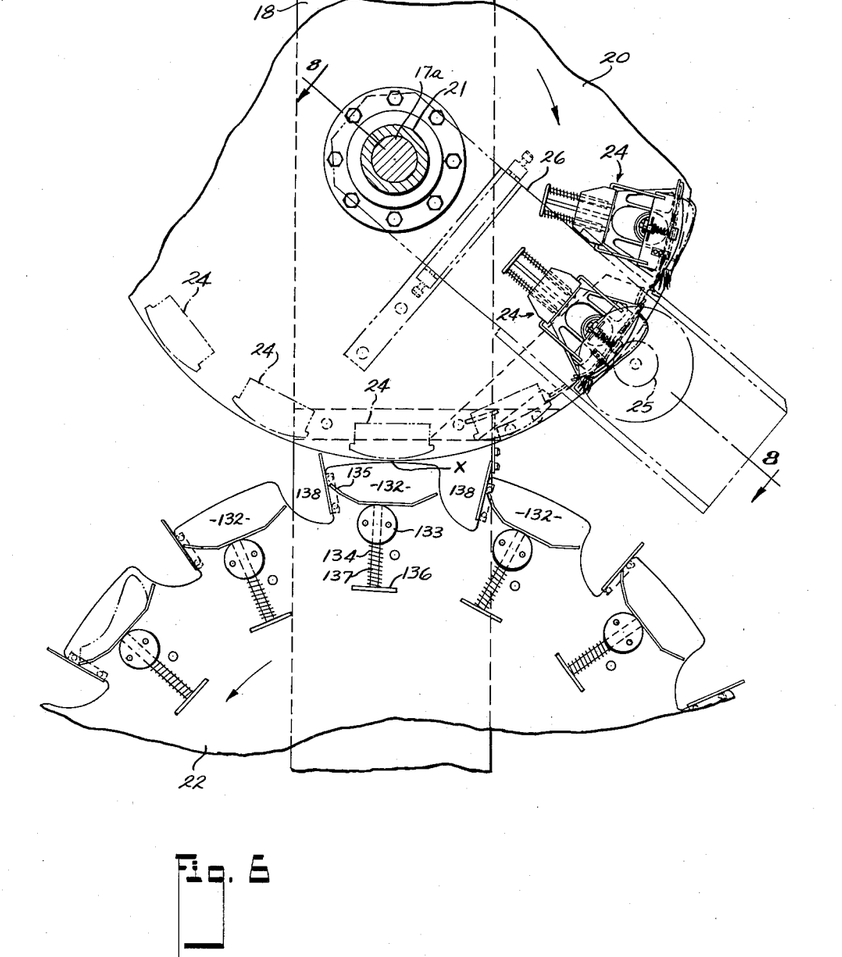
Fig. 6 is a fragmental top plan view, enlarged, of the first and second rotatable table conveyors taken along the line 6—6 of Fig. 1 and showing in dot-dash lines the position of the support for the saw rotating motor.
Figure 9:
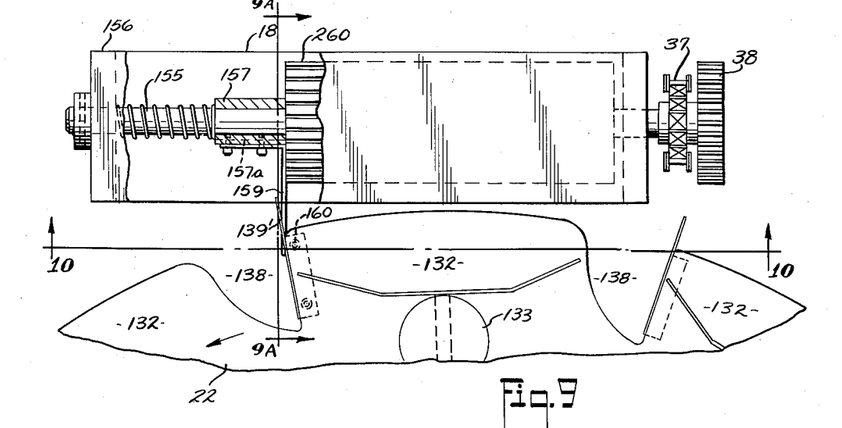
Fig. 9 is a top plan view of the deshelling rollers on an enlarged scale taken along the line 9—9 of Fig. 1 with a fragmentary showing of the second rotatable table conveyor which brings the shrimp to the rollers.
Figure 9A:
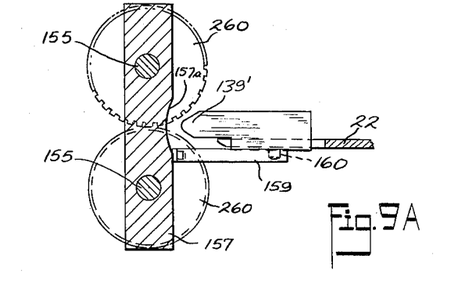
Fig. 9A is a fragmental sectional view taken along the line 9A—9A of Fig. 9.

Rotatable table 20 is provided with a plurality of clamps 24, seen in Figs. 4 and 6, and these are at regularly spaced loading stations around the periphery of the table 20. Only portions of two diametrically opposite clamps are shown in Fig. 1 so as not to confuse the drawing. The operator sits at a loading station which is opposite the clamp shown at the left hand end of Fig. 1. She places a shrimp in position in each clamp as it passes her, the clamp is then closed, and the table 20, rotating in the direction of the arrow of Fig. 3 and Fig. 6, carries the clamped shrimp around the table 20 in clockwise direction as viewed in Fig. 6. After about 140 degrees of travel from the loading station, the shrimp encounters a rotating saw blade 25 which is operated by a motor supported on arm 26 which in turn is fixed to the post 17a. The adjustment and timing of this saw will be later described. After the passing of the saw, the shrimp travels in its clamp another 40 degrees to the point of tangency between tables 20 and 22, as seen in Fig. 6. The clamp is automatically released just before reaching the tangent point. A pusher then pushes the shrimp from table 20 to table 22 so that, whereas the dorsal side was radially outward on table 20, the ventral side is now radially outward on table 22. Table 22 then travels in a counterclockwise direction as indicated by the arrow in Fig. 6 until the shrimp is 180 degrees opposite the transfer point. This position is indicated in Fig. 9 and the shrimp is then opposite the deshelling rollers 26a. Another pusher device then pushes the shrimp into the bite of the rollers which remove the shell after which the shrimp drops into the delivery chute 27.

Tables 20 and 22 are rotated by means of an electrical motor 28 whose housing is rigid with a reduction gearing housing 29 which in turn is mounted rigidly on the upper base member 18. The motor drives a vertical shaft 30 which has a bevel gear connection with a horizontal shaft 31 which at one end has a worm and gear connection with sleeve 21 which drives table 20, and at its opposite end it has a worm and gear connection 32, 33 with sleeve 23 through which it drives table 22.

Electrical motor 34 has its housing rigidly connected with reduction gearing housing 35 through which it is rigidly mounted on the upper base member 18. The output shaft 36 from the reduction gearing is connected by drive chain 37 to a sprocket which drives the upper roll 26a while a gear connection 38 between the two rolls causes the lower roll 26b to be driven in timed relation to the upper roll.

Three small air servomotors are provided for the essential movements of my machine. Servomotor 39 is located at the loading station and serves to close the clamp after the operator places the shrimp in proper position.

This is seen in Figs. 1 and 3. Servomotor 40, seen Figs. 7 and 8, manipulates the saw into and out of cutting position in the shrimp. Servomotor 41 seen in Figs. 1, 2, 11 and 13, operates the two pusher devices, one of which transfers the shrimp from table 20 to table 22, and the other of which transfers the shrimp from table 22 to the deshelling rollers. Each of these servomotors is double acting and at one time is supplied through air under pressure from line A while exhaust occurs through line B. At another time, each motor is supplied through line B and exhausted through line A. A suitable source of air under pressure is provided at line 43 and this operates through an assembly 44 which provides a filter, a pressure regulator and an oil fog introduction for lubricating purposes. The outlet from this assembly is through line 45 to a main air control valve shown at 46 in Fig. 1. This is a known three-way valve having up and down positions, in one of which it connects supply line 45 with either A or B while the other of the lines A or B is connected to exhaust. In the other position of valve 46, the connections are just reversed so that in one position of valve 46 line A is under pressure and line B is exhaust and in the other position of valve 46 line B is under pressure and line A is exhaust.

Control of valve 46 is controlled by cam 47 which is seen in Figs. 1, 2, 7 and 8. As viewed in Fig. 1, a lever 48 has a fixed pivot at the right hand end and at its left hand end carries a small bracket with a rotatable roller depending slightly below the end of the lever 48. This provides a follower for the cam 47 so that the lever 48 oscillates up and down as the roller rides alternatively over the projection and recesses of cam 47. As seen in Fig. 1, the upper side of lever 48 engages against a valve stem projecting from valve 46. When lever 48 is in its upper position, valve 46 is in one of the positions where it provides air under pressure to one of the lines A or B. When the roller drops into one of the recesses in cam 47, then lever 48 releases the control stem of valve 46 allowing it to drop to its lowermost position where the air under pressure is supplied to the other one of the two conduits A and B. The various servomotors herein described as being under the control of valve 46 are so positioned, and the parts controlled thereby are so related to the rest of the machine, that each of the strokes of the various servomotors occurs at the appropriate time to carry out its functions hereinafter described.

The electrical energization of the machine is through an electrical cable 49 which is plugged into a sutable electrical outlet. Box 50 contains suitable switches and motor starters, box 51 includes control switches near the operator, conduit 52 connects boxes 50 and 51, conduit 53 leads to the saw rotating motor, conduit 54 leads to motor 28 and conduit 55 leads to motor 34.

Figure 5:
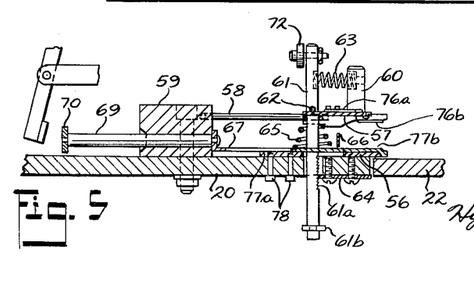
Fig. 5 is a fragmental sectional view taken along the line 5—5 of Fig. 4.

Referring now to Figs. 3, 4 and 5, each of the clamps 24 is quite similar in many respects to that disclosed and claimed in Yanus et al. Patent No. 2,789,309. Each of the clamps 24 is alike and, therefore, one only will be described. The lower jaw of the clamp is formed by pad 56 secured to the table 20. This pad preferably is inclined upwardly and rearwardly toward the tail of the shrimps clearly seen in Fig. 3 so that the midportion or sand vein of the shrimp will lie generally horizontal in the clamped position of Fig. 3. The upper jaw of the clamp comprises a plate 57 which is rigidly supported by two parallel arms 58 which extend radially inward and have their inner ends bent at right angles and inserted in recesses in a block 59 which is rigidly secured to the table 20. These ends 58a of the arms 58 provide a coaxial pivot for the upper clamping jaw. From the upper face of the jaw there extends a fixed clamping abutment post 60 which is rigid with the plate 57. A clamping ratchet post 61 is pivotally mounted on the plate 57 at a horizontally extending pivot 62. This provides oscillation of the post 61 in a plane extending radially of table 20. A compression spring 63 is held between the posts 60 and 61, being inserted in pockets in each of them and urging the post 61 in a counterclockwise direction around pivot 62. A lower portion of post 61 is provided with ratchet teeth 61a facing radially outward and in position to engage a hardened steel dog plate 64 which is fixed to the lower face of table 20. A roller 61b is held on the lower end of the post 61 rotatable about a vertical axis for a purpose later described. A spiral helical spring 65 is engaged between table 20 and the lower side of plate 57 around the post 61 so that it normally urges the upper jaw 57 of the clamping plate upwardly when released by the dog and ratchet mechanism. It results from this construction that when the jaws are open and a shrimp is placed between the upper and lower clamping jaws, a movement downwardly on the post 60 will carry one of the ratchet teeth 61a into engagement with the dog 64 under the urging of spring 63. When the shrimp is firmly clamped, it will be held in that position by the dog and ratchet combination. When the post 61 passes downwardly through an opening in the table 20, there is enough play to permit the lower end of post 61 to be moved toward the left in Fig. 5 so as to clear the ratchet teeth from the dog 64, whereupon the spring 65 will open the clamp.

The back wall of the clamp, just above the pad 56, comprises a sinuous flange 66 extending generally vertically upwardly from a plate 67 which has large portions cut out to save weight. The rear end of this plate is turned up to provide another vertical flange 68 to which are rigidly fixed three parallel rods 69 which extend slidably through suitable horizontal openings in block 59. The rear end of these rods are connected together rigidly by a pusher plate 70. Helical springs 71 on the outer of the rods 69 are held between block 59 and pusher plate 70 so as to urge the plate 67 and the accompanying backing plate 66 normally toward the left in Figs. 4 and 5. However, when a pusher moves the abutment 70 toward the right as viewed in Figs. 4 and 5, when the clamp is open, the plate 67 and the backing plate 66 can move toward the right over the pad 56 so as to discharge a shrimp radially outwardly from table 20. A roller 72 is rotatably mounted on a horizontal axis at the upper end of post 61 for a purpose later described. A pin 73 is mounted for vertical reciprocation lengthwise through an opening 20a in table 20 and in pad 56 and a suitable aligned opening in a bracket 74 secured to the under side of the table. A helical spring 75 is engaged between the lower surface of table 20 and a collar fixed to the pin 73 so as to normally urge the pin downwardly to the position shown in Fig. 3. The upper end of the pin is pointed and in position to enter the sixth section of the shrimp, or that portion just adjacent the tail, as shown in Fig. 3 so long as pin 73 is held upwardly by means later described.

All of the above described parts of the shrimp clamp carry out the same functions in much the same manner as described in the above mentioned Yanus et al. Patent No. 2,789,309. The changes therein for the present purpose will now be described. Cracking bars are provided so that when a clamp is closed upon a shrimp, as seen in Fig. 3, these cracking bars will crack the knuckle between the fifth and sixth sections of the shrimp shell. The shrimp is so constructed that the arrangement of the cracking bars about to be described serves to break the skeletal connection between the shell sections five and six when the clamp is operated as herein described. The upper cracking bar 76 has a securing portion 76a which is fastened to the upper surface of plate 57. The radially outermost portion 76b extends downwardly below the plate 57 and slightly radially outwardly therefrom as indicated in Fig. 4. The lower cracking bar 77 has a securing portion 77a which is fastened to table 20 by the screws 78. It then extends upwardly and radially outwardly across the pad 56 providing the cracking jaw portion 77b vertically beneath the upper cracking bar 76b.

For processing round fantail shrimp the backing plate 66 may be used as shown herein which corresponds generally to the shape of the same portion in the above mentioned Patent 2,789,309 wherein cocktail shrimp are processed. However, for the processing of butterfly fantail shrimp, I prefer to secure an auxiliary backing plate 79 radially opposite to and radially outward from the backing plate portion 66 previously described. A simple way to do this is shown in Figs. 4 and 14A where the part 79 is secured to the part 66 by means of bolts 80. The chief difference here is that the part 79 is substantially linear at its midportion rather than curving radially inwardly as the part 66 does. This contruction makes it convenient to change between round and butterfly fantail shrimp by either adding or taking away the additional backing plate 79.

Referring now to Figs. 3 and 3A, I have provided a safety device to protect the parts against damage in case air pressure should fail in the servomotor 39 allowing the parts connected to the piston of the servomotor to drop downwardly. It will be understood that there is a piston not shown in the servomotor 39 which is connected with the piston rod 39a. The lower end of the piston rod carries a hammer-like end 39b which is vertically above the post 60 on each upper clamp 57 as it passes beneath the closing device. As viewed in Fig. 3, it will be realized that the post 60 has been moved downwardly from its full open position in order to clamp the shrimp. Without my safety device, if the member 39b were in its lowermost position because of failure of air and then an open clamp came along, the post 60 would strike the member 39b and damage the part. To prevent this, I provide a clamp protecting safety cam 81 having one end secured by tabs 81a to the piston rod 39a. The outer end or right hand portion as seen in Fig. 3 carries a positioning pin 82 rigid with cam 81 and passing in a sliding manner through a suitable opening vertically above the plate 18. The cam surface 81b is inclined downwardly in the direction or rotation of table 20 and extends to a point below the lower end of piston rod 39a in its lowermost position (due to lack of air). Thus, if a clamp comes along in open position, the post 60 (dot-dash position in Fig. 3A) will ride downwardly on the cam surface 81b, and the ratchet teeth 61a will then engage the dog plate 64 to hold the clamp in a lower position so that it passes safely under the lower end of the piston rod 39a.

Figure 7:
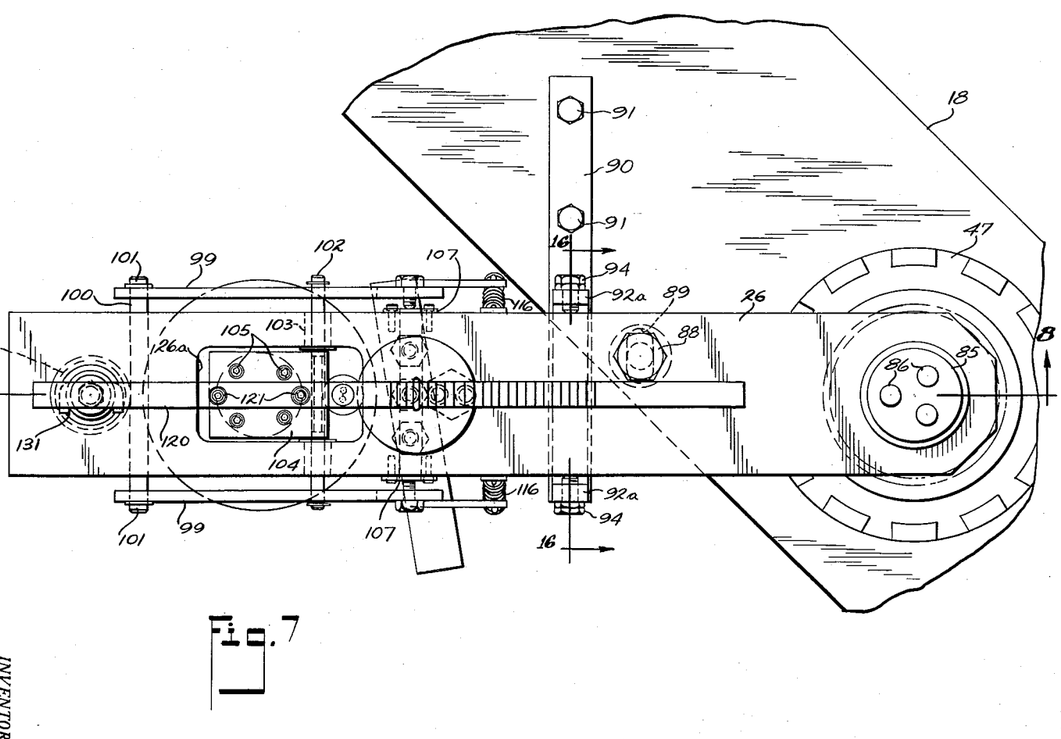
Fig. 7 is a top plan view, enlarged, of the mounting for the saw and its rotatable motor and also showing the air valve timing cam.
Figure 16:
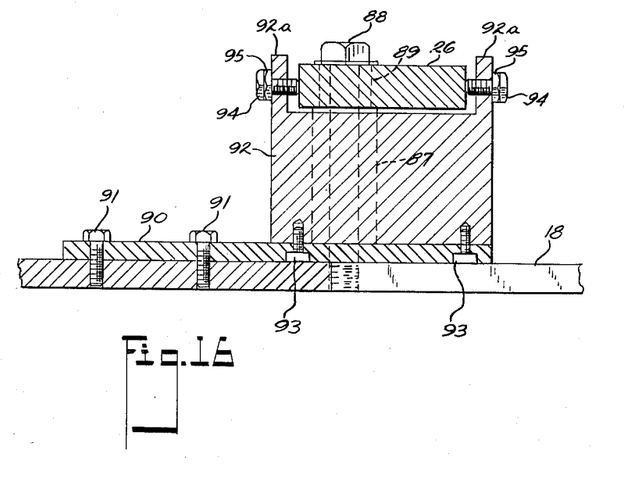
Fig. 16 is a fragmental sectional view taken along the line 16—16 of Fig. 8.

After the shrimp has been carried in its clamp 24, by movement of table 20, approximately 140 degrees in the direction of the arrow of Fig. 6, from the loading station shown in Fig. 3, it is presented to the saw 25 for the cutting action which enters through the dorsal side of the shrimp. The center line of the arm 26, previously mentioned, is approximately 140 degrees from the loading station and approximately 40 degrees from the transfer station where the shrimp is moved from table 20 onto table 22. Referring now to Figs. 7 and 8, I have shown the mounting of the arm 26 which supports the motor which rotates the saw 25. At the right hand side of Fig. 8 is seen the bearing sleeve 17 which surrounds the upright post 17a fixed to base plate 16. Table 20 is rotatable about this post through the rotatable sleeve 21 surrounding the post 17a and driven by the worm gear 33a by means previously mentioned. The cam 47 is shown mounted on table 20 outside of sleeve 21 and rotatable therewith. Above the sleeve 21 is a bearing ring 83 or spacer. A spacer sleeve 84 snugly surrounds the post 17a and extends between members 18 and 26. A cap 85 rests on top of the arm 26 and is secured by screws 86 which are threaded into the top of post 17a so as to firmly hold the arm 26. A short distance radially outwardly from the post 17a is another spacer sleeve 87 which fits snugly between the parts 18 and 26 and which is held in such clamped position by the bolt 88 which passes through a slotted opening 89 in the arm 26, then downwardly through the sleeve 87 and is threaded at its lower end into the member 18. In positioning the arm 26 in approximately the proper location, bolt 88 and screws 86 are loosened somewhat and a rough adjustment is made of bolt 88 in the slot 89. Then bolt 88 and screws 86 are tightened. A further more accurate positioning means for arm 26 is provided slightly radially outwardly from bolt 88 and sleeve 87. This is clearly seen in Figs. 7, 8 and 16. To member 18 is rigidly secured a bar 90 by means of screws 91. To the upper face of this bar there is secured a block 92 by means of screws 93. The upper edge of this block is bifurcated providing two end flanges 92a parallel to each other. Threaded through these two arms are screws 94 which engage against opposite sides of the arm 26 in such a manner that a very fine adjustment of the position of arm 26 angularly about the post 17a may be arrived at. Thereafter, lock nuts 95 hold the parts in the desired position.

Near the radially outer end of arm 26 there is provided a frame for the support of motor 96 whose shaft 97 is connected by means of hub 98 with a saw 25. This motor support frame comprises two parallel generally L-shaped side frames 99, best seen in Figs. 7, 8 and 15, and connected together at the outer end by a pivot pin 100 which passes through the arm 26. Each frame member 99 is held against a shoulder on pin 100 by means of a securing screw 101. Motor 96 is pivotally mounted in the side frame members 99 by means of a pivot pin 102 which passes through the arms 99, then through clearance openings 103 in the arm 26 and is then snugly received in an opening in plate 104 which is rigidly secured to the housing of motor 96 by screws 105. There is an opening 26a provided in arm 26 to receive the plate 104 and the electrical conduit 53 which carries the electric circuit to the motor. Thus, pivotal movement of the frame members 99 around the pivot 102 causes a slight raising and lowering action of motor 96 and saw 25, by means of a control later described, so as to adjust the saw 25 to enter the body of a shrimp substantially midway between the top and bottom of the shrimp regardless of its thickness. The frame members 99 are accurately guided during this vertical movement by means of two screws 106 which are threaded through each of the members 99 and have their inner ends engaging against hardened steel plates 107 which are secured to opposite sides of the arm 26.

Figure 15:
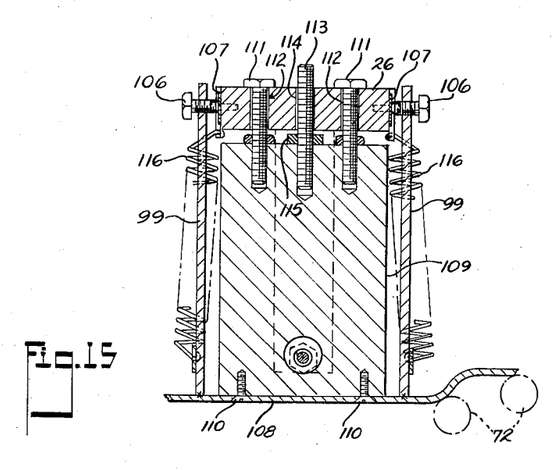
Fig. 15 is a fragmental sectional view taken along the line 15—15 of Fig. 8.

Means is provided for limiting the vertical movement of the motor support frame about the pivot 100. This is best seen in Figs. 7, 8 and 15. This means comprises a cam bar 108 which is secured to the lower ends of the side frame 99 and in turn has secured to it a block 109 by means of screws 110. Into the upper ends of this block are threaded two screws 111 which pass freely through two holes 112 in arm 26. Thus, movement of block 109 and the attached motor support frame downwardly is limited when the heads of screws 111 strike the top surface of arm 26. Another screw 113 is threaded into the upper end of block 109 and passes freely through an opening 114 in arm 26. This screw carries a nut 115 which limits the upward movement of block 109 and the attached motor support frame when nut 115 engages the under side of arm 26. A pair of generally vertically extending helical springs 116 are attached between brackets 117 at the upper end secured to arm 26 and brackets 118 at the lower end secured to block 109. These springs counterbalance the major portion of the weight of motor 96 and its supporting frame so that it is raised and lowered very easily.

This raising and lowering motion of motor 26 and its associated saw 25 is quite similar to that described and claimed in my copending application Serial No. 406,574, filed January 28, 1954, which has matured into U.S. Patent Number 2,849,750 issued September 2, 1958. As each clamp 24 arrives at the saw position, its roller 72, shown dot-dash in Fig. 8, on top of post 61 engages cam 108 so as to lift the supporting frame, the motor 96 and the saw 25 a distance which is proportionate to the thickness of the shrimp in the clamp. The lever arm from the point of application of the force at roller 72 with respect to the pivot 100 is about twice the length of the lever arm of the saw about the pivot 100 so that the level of the saw 25 is changed about one-half of the total thickness of the shrimp so that no matter what the thickness of the shrimp, the saw enters at about the midportion thereof for its cut. This is disclosed and claimed in my copending application.

Means is provided for tilting motor 96 between the full line and broken line positions in Fig. 8 so that the saw 25 is held clear of the shrimp except when it is fed inwardly to cut along the dorsal side of the shrimp through shell sections one to five inclusive. In the first place, it should be noted in Fig. 8 that the center of gravity of motor 96 is to the left of the vertical plane through pivot 102. Thus, there is a tendency for the motor to swing around the attached plate 104 in a counterclockwise direction. This tendency is counterbalanced so that motor 96 is easily swung radially inwardly and outwardly. This counterbalance comprises two rigid spacer sleeves 119 which extend vertically upward from block 104, and across the top of which is rigidly secured a counterbalance arm 120 by means of long screws 121 which pass through arm 120, down through the sleeves 119 and are threaded into block 104. A counterbalance weight 122 is adjustably mounted in any one of the notches 120a in arm 120 by means of a U-shaped handle 123 on the balance weight. This weight thus tends to move the motor 96 in a clockwise direction about pivot 102. The means for positively tilting the motor 96 radially inwardly and outwardly is the servomotor 40 previously mentioned. This servomotor has a cylinder secured to the under side of arm 26 near its outer end. It has a piston (not shown) connected with a piston rod 40a which extends upwardly through a clearance opening in the arm 26. To the upper end of this piston rod there is secured a bifurcated shoe 124 which straddles the arm 120 from below. A helical tension spring 125 connected between the radially outer end of arm 120 and the radially outer end of arm 26 causes arm 120 to remain in its bifurcated seat 124 and to follow the action of the piston rod. A spiral helical compression spring 126 is engaged between arm 26 and the upper end of piston rod 46a so as to normally bias the motor 96 toward the broken line position of Fig. 8.

Means is provided for limiting the depth of cut of saw 25 as it moves radially into the shrimp body. A hexagonal rigid post 127 is secured to the under side of arm 26 by means of screws 128. Through the lower end of this post there is threaded horizontally a stop screw 129, the radially outer end of which engages against the housing of motor 96 to limit its radially inward movement. A lock nut fixes the position of screw 129. This screw operates freely through an opening 109a in the block 109. A further adjustment of the innermost position of the peripheral edge of saw 25 is provided by one or more thin shims 131 which are insertable as desired between the bottom of the bifurcation in the member 124 and the under surface of the arm 120. The more of these shims which are inserted at 131, the more the motor 96 and saw 25 is naturally caused to ride in a clockwise direction around the pivot 102.

On rotatable table 22 there are a plurality of shrimp receiving stations which are equally spaced around the periphery of table 22 and so spaced and table rotation so timed that each of these shrimp receiving stations 132 register, at the point of tangency X (Fig. 6) between tables 20 and 22, with one of the clamping stations previously described. At each shrimp receiving station the structure is like that shown in the Yanus et al. Patent 2,683,281. A block 133 is secured to table 22 and has a horizontal opening through which a pusher bar 134 freely slides. At the outer end of the pusher bar is a pusher plate 135 secured to the bar and adapted to push a shrimp into the rolls 260 for deshelling. At the radially inner end of each bar 134 is a pusher abutment 136. A helical spring 137 surrounds each bar 134 between plate 136 and block 133 so as to urge each pusher plate 135 radially inwardly. Between each two of the stations 132 there is a clearance opening 138 through which the finished shrimp is more readily dropped into the chute 27. Each station 132 carries a scraper bar 139 adapted to pass close to the bite between rolls 260 as table 22 rotates so as to clear the deshelled shrimp from the deshelling rolls.

The servomotor 41, mentioned previously, is utilized to actuate the transfer of a shrimp from table 20 to table 22 and also the transfer of a shrimp from table 22 into the deshelling rolls 260. The connection for bringing this about are shown somewhat diagrammatically in Fig. 11. Radially inwardly of table 20 opposite the point of tangency X there is pivoted to the under side of upper base member 18 a two part lever 139. Its upper end is pivotally connected at 140 to member 18. The lower end of this lever carries a positioning cam 141 which is slightly convex radially outwardly and of generally the same shape as a similar member 148 shown in Fig. 13. The lever 139 is steadied by a second lever 142 parallel to the lever 149 and mounted on an aligned pivot 140a. Spacer bars 143 connect the levers 139 and 142 so that they act together as a strong and rigid member.

Figure 12:
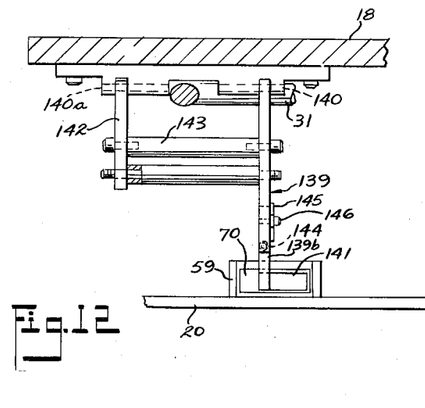
Fig. 12 is a transverse sectional view enlarged taken along the line 12—12 of Fig. 11.
Figure 13:
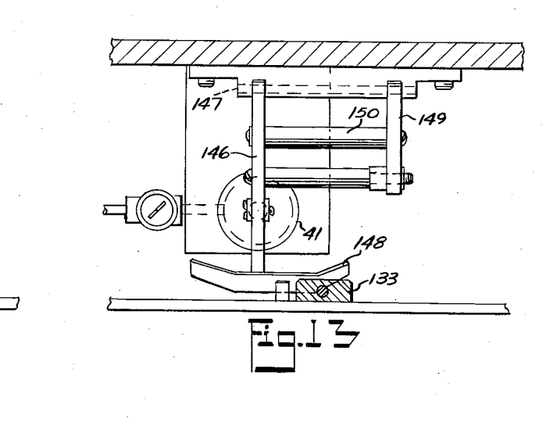
Fig. 13 is a view enlarged taken along the line 13—13 of Fig. 11.

I incorporate a safety feature in the lever 139 so as to prevent damage of the parts if lever 139 or member 141 is lying in the path of abutment plate 70 and its connected bar 69 as table 20 rotates. This is seen in Figs. 11 and 12. The upper lever portion 139a has a lower lever portion 139b parallel and contiguous and overlapping and secured to it by means of a pivot pin 144. A fairly easily bendable plate of metal 145 is secured by screw 146 to lever portion 139b in a position so that a portion of its overlaps the lever portion 139a. Normally, movement of lever portion 139a will carry with it lever portion 139b so as to actuate the abutment plate 70. However, if there is relative rotational movement of member 70 past the lever portion 139b, this lower portion will be rotated about its pivot 144 bending the metal plate 145 in the process. This protects the parts against damage. In order to utilize this safety device several times, I have shown the metal plate 145 in the shape of a cross so that it may be rotated 90 degrees to bring a new flat portion in position against the member 139a after one bending operation.

Over on table 22, the lever 146 is pivotally connected to member 18 at 147. The lower end of this lever carries plate 148 adapted to cam the lever slightly relative to the abutment plate 136 if necessary. A second parallel short lever 149 is also pivoted at 147 and rigidly connected by the members 150 with the lever 146 so as to give a strong and rigid lever action.

The unoperated position of levers 139 and 146 is shown in Fig. 11. Air is then entering servomotor 41 through line A and driving the piston (not shown) toward the left as viewed in Fig. 11. The piston rod 41a of this servomotor is pivotally connected to lever 146. A long link is pivotally connected at one end to lever 146 at 152 and the other end is pivotally connected to lever 139 at 153. A tension spring 154 is connected between link 151 and member 18 and normally urges the link toward the left as viewed in Fig. 11 and causes levers 139 and 146 to return to the inoperative position if air supply for servomotor 41 fails. When a transfer action is to take place, servomotor 41 receives air through line B from valve 46 controlled by cam 47 causing the servomotor to make a stroke toward the right as viewed in Fig. 11 and causing lever 139 to push abutment 70 and the clamp pusher plate 66—79 toward the right as viewed in Fig. 11 so as to push a shrimp off of table 20 onto table 22. At the same time, lever 146 moves toward the right as viewed in Fig. 11 engaging abutment plate 136 and pushing a shrimp off table 22 into the bite of deshelling rolls 260.

The deshelling rolls 260 are mounted on a pair of parallel shafts 155 which are rotatably mounted in brackets 156 which are rigidly secured to the under side of the member 18. At one end the shafts carry the spur gears 38 previously mentioned which intermesh. The upper shaft 55 is provided with a drive sprocket 37a which is driven by chain 37 as previously described. Preferably, the rolls are rubber covered and have grooves extending axially of one roll and peripherally of the other roll. In the drawings I have shown the grooves extending approximately ⅛ inch radially inward in the upper roll 260 and extending parallel to each other and parallel to the axis of the roll. These grooves are about $\frac{1}{16}$ inch wide and spaced about $\frac{5}{15}$ inch apart. On the lower roll, similar grooves, spaced about the same distance apart, extend annularly around the lower roll 260 at right angles to its axis. This arrangement of grooves in the two rolls gives a better grip on the shell of the shrimp during the deshelling action.

Figure 10:
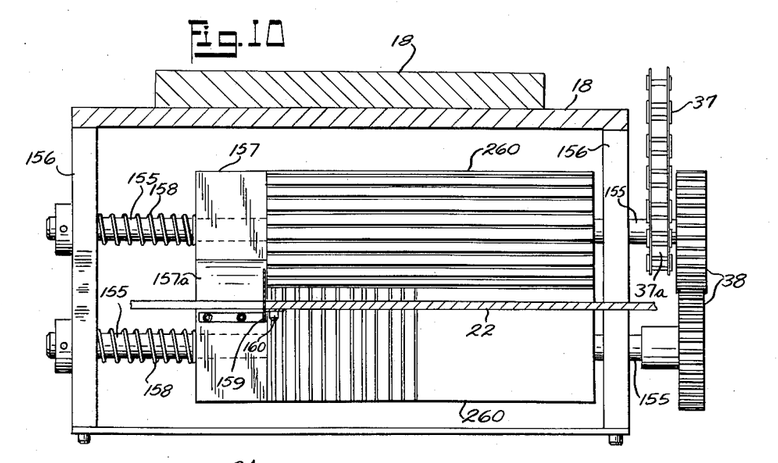
Fig. 10 is a sectional view on an enlarged scale taken along the line 10—10 of Figs. 1 and 9 and showing the deshelling rollers in elevation.

An improvement in the present rolls consists in making them shorter than in the Yanus and Cerny patent mentioned above, and providing a guard plate 157 abutting the ends of the two rolls and at the downstream end thereof with respect to shrimp travel as carried by table 22. The plate 157 lies opposite the tail and the sixth shell section of the shrimp so as to insure that these portions are not drawn through the rolls in the deshelling action. Preferably, but not necessarily, a shallow depression 157a is provided opposite the bite of the two rolls and on the side of the plate 157 from which the shrimp enters the rolls. This recess 157a is of a size to receive the tail end of the shrimp body in the recess. It holds the tail end of the body just in front of the bite of rolls 260. The plate 157 has suitable bores through which the shafts 155 pass so that plate 157 is slidable lengthwise of the shafts. A helical spring 158 surrounds each shaft 155 between bracket 156 and plate 157 so as to urge the plate against the ends of the rolls 260. A trip bracket 159, generally L-shape, has one arm rigidly secured to guard plate 157 and has the other arm extending toward and beneath the peripheral edge of table 22 as clearly shown in Figs. 9 and 10. A stud 160 projecting below the bottom of table 22 is in position to strike the trip bracket 159 as table 22 rotates in the direction of the arrow of Fig. 9. This carries the trip bracket 159 and guard plate 157 toward the left as viewed in Figs. 9 and 10, a short distance until stud 160 slides off the end of bracket 159 after which plate 157 is snapped by springs 158 back toward the ends of rolls 260. This frees the shrimp from the rolls and also clears the ends of the rolls of any bits of meat or shell.

Figure 14:
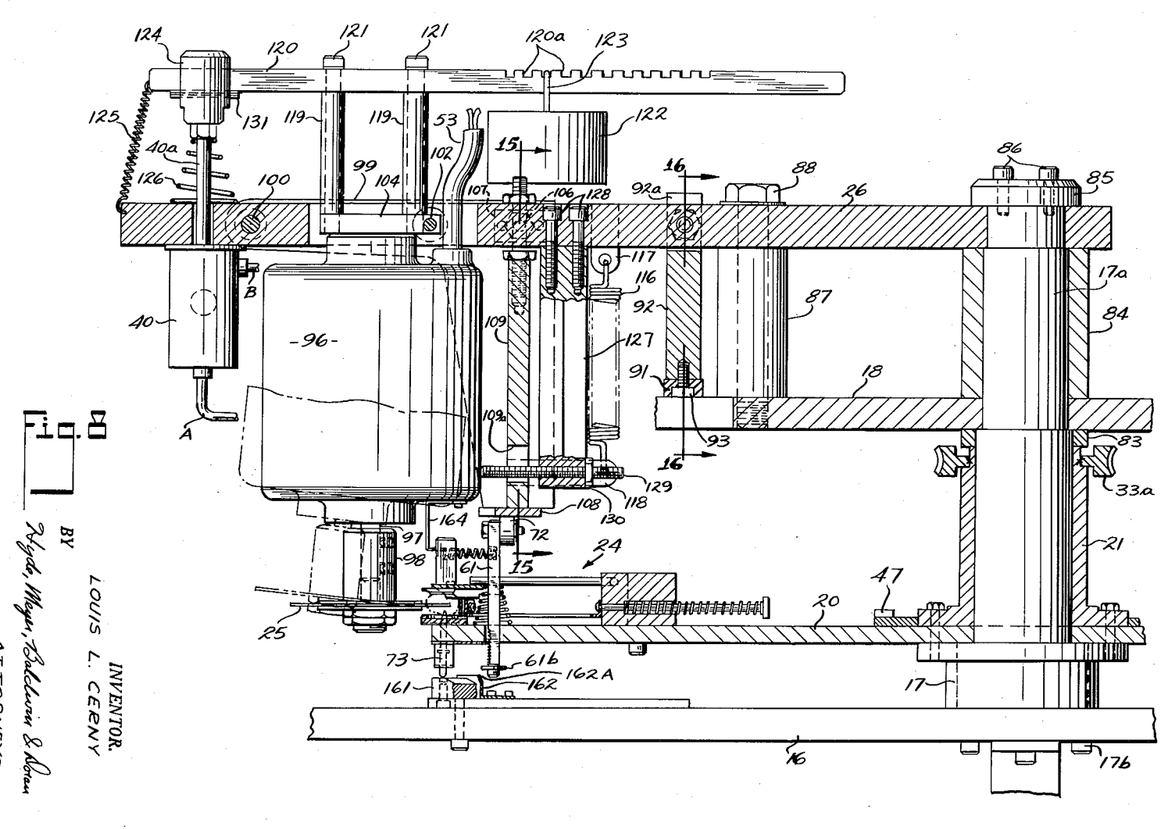
Fig. 14 is a fragmental perspective view, enlarged, taken as a shrimp in a clamping station is about to be engaged by the saw.
Figure 14A:
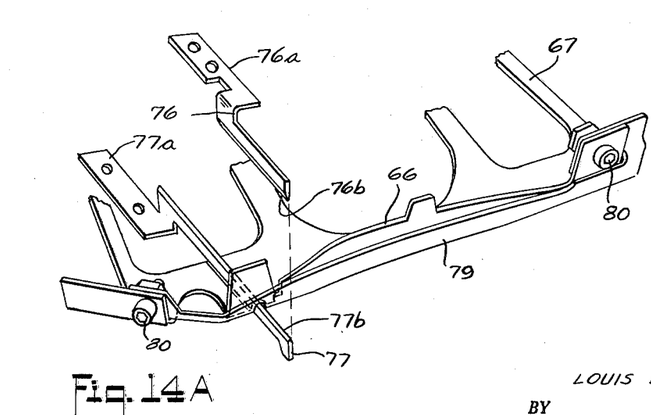
Fig. 14A is a perspective view of certain clamp parts toward the right hand side of Figs. 4 and 5, with other parts left out for clearness.

Referring now to Fig. 14, a cam 161 is rigidly secured to table member 16 by means of rigid bar 163 and has its leading edge 161a sloping downwardly against the direction of rotation of table 20. The upper surface of cam 161 is in position to engage the lower end of pin 73 and to drive the pin upwardly so as to cause its sharpened upper end to enter well into section six of the shrimp body as previously described. When pin 73 rides off the far end of cam 161, at the end 161b, then spring 75 urges pin 73 downwardly out of the shrimp.

Another plate cam 162 is also carried by the rigid bar 163 to which the cam 161 is affixed. This cam extends generally vertically upwardly and is generally arcuate in form. Its leading edge as shown at 162a, clearly seen in Figs. 8 and 14, is bent slightly outwardly radially. The top of this cam at its leading edge is such that when a shrimp is in clamp 24, as viewed in Fig. 8, the roller 61b on the lower end of each post 61 clears the cam 162. However, if no shrimp were placed in the clamp at the loading station, then post 61 would be driven to its lowermost position by servomotor 39 and roller 61b will lie radially opposite the cam 162. Just before each clamp 24 reaches the saw 25, if the clamp is fully closed, then its roller 61b will engage cam 162 and cause the clamp to open partly until its roller 72 strikes the cam 108. This opens the clamp jaws sufficiently so that the saw 25 will not cut them.

If a clamp is open when its roller 72 strikes cam 108, then the slope of cam 108 will close it. This position of roller 72 with respect to cam 108 is shown in dotted lines in Fig. 15, whereas the dot-dash line of Fig. 15 shows roller 72 as it approaches cam 108 with a shrimp normally clamped between its jaws.

In case of air failure in the servomotor 40, which tilts motor 96 and saw 25, safety means is provided to carry the saw radially outwardly as each clamp approaches it so as to avoid damage to the saw and to the clamp part. This is clearly shown in Figs. 8 and 14 where a cam 164 is rigidly secured to the lower end of the housing of motor 96. From its leading edge, this cam slopes radially inwardly in the direction of travel of table 20. Cam 164 has its inclined portion in position to engage post 60 mounted on upper clamp jaw 57. Thus, if the motor 96 is not kicked radially outwardly by the servomotor 40, the post 60 will strike cam 164 and cam the motor outwardly so that saw 25 does not engage any of the clamp parts.

Cam 165 (Figs. 1 and 14) is positioned below table 20 so as to engage the roller 61b at the lower end of each post 61 slightly before each clamp 24 reaches the tangent point X during the travel of table 20. Cam 165 is arranged to push roller 61b radially inwardly so as to release the ratchet teeth 61a from the plate dog 64, permitting spring 65 to open each clamp just before it reaches the transfer point.

Water jets connected with a suitable source of water under pressure are utilized for several purposes around my machine. Referring to Fig. 1, and moving from the right side toward the left, water jet 166 clears the empty shell from the rolls 260. Water jet 167 is directed radially inwardly of table 22 toward each pusher plate 135 as it is carried by on rotation of table 22. The action of this jet 167 is that it pushes the tail end of each shrimp firmly against the pusher plate 135 just before each station 132 arrives in front of the rolls 260. This insures that the tail end of the shrimp is back in its proper place so that the main body of the shrimp, which is to be deshelled, enters the bite of the rolls 260 first. Water jet 168 is located approximately opposite the central portion rolls 260 and directed toward the bite of the rolls so as to push the shrimp body into the rolls for deshelling. Water jet 169 (seen on Fig. 2) is directed toward the edge of the saw cutter 25 so as to keep the saw clean. Jet 170, seen on Fig. 2, is for use with a catch tray (not shown) which gathers refuse from the sawing operation and must be cleared from time to time.

Figure 17:
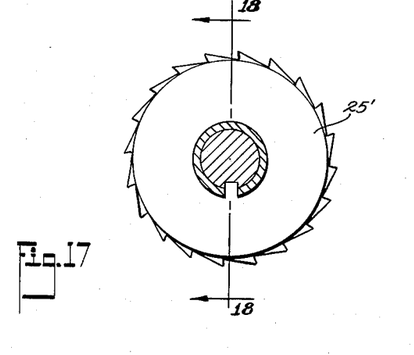
Fig. 17 is a top plan view enlarged of a saw used in processing butterfly fantail shrimp.
Figure 18:
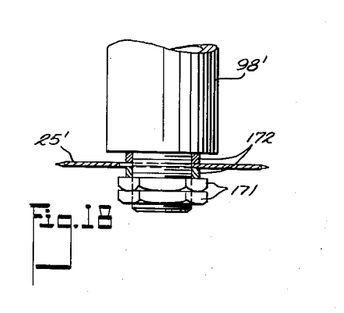
Fig. 18 is a sectional view of the same taken along the line 18—18 of Fig. 17.

In Figs. 17 to 20, I have shown two different types of saw which are useful with my invention. In Figs. 17 and 18, I have shown a thin flat saw which I prefer to use in the processing of butterfly fantail shrimp. This saw is either secured to shaft 97 of motor 96 or to a similar shaft 98' which is part of the hub or coupling 98 mentioned in connection with Fig. 8. The saw is secured to the end of the shaft by the nuts 171 threaded on the shaft. The saw is held between two spacing washers 172. In using this type of saw, the limitations of the motor travel inwardly are so adjusted, as previously described, that the saw blade 25' cuts through the shrimp to within about 1/8 of an inch of the ventral side thereof.

Figure 19:
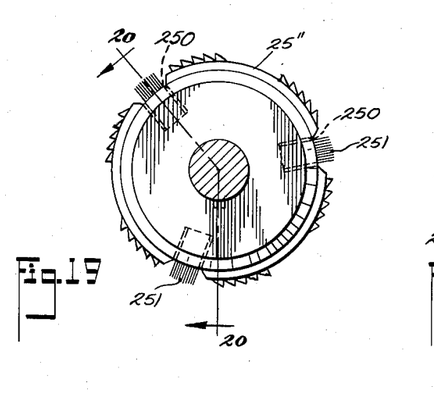
Figure 20:
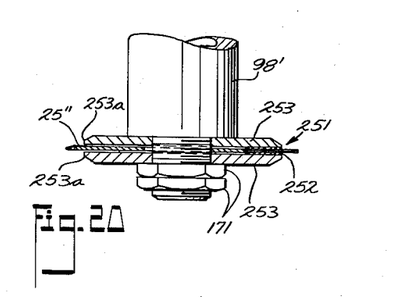
Fig. 20 is a sectional view of the same taken along the line 20—20 of Fig. 19.

The form of saw shown in Figs. 19 and 20 I prefer to use in preparing cocktail shrimp or round fantail shrimp. This saw comprises a blade 25'' having saw teeth around the periphery which are interrupted. A plurality of recesses 250 are provided in the periphery of the blade opening outwardly. Preferably, three such recesses are provided evenly spaced about the circumference of the saw but it is obvious this number may be varied. In each of the recesses I insert a flat brush 251 which comprises a large number of rather fine bristles encased in a cup-like holder 252 of copper or the like. The thickness of the holder 252 is a few thousandths of an inch greater than the thickness of blade 25''. Then when the blade is secured on the shaft 98' between two flat washers 253, the securing nuts 171 cause the washers 253 to grip the brush holders tightly and hold the entire device assembled as shown in the drawings. In the operation of this device, the shoulders 253a at the periphery of the washers 253 limit the entrance of the saw blade into the shrimp body if other limiting devices fail to do so. Also, as the teeth of the saw blade 25'' cut into the sand vein of the shrimp, the brushes 251 clean out the sand vein.

What is claimed is:

1. A clamp for processing fantail shrimp comprising two elongated jaws having means mounting them for relative approach and separation movement to receive the body of a shrimp between them with the shrimp body extending along the elongated direction of the jaws, and a bar on each jaw extending into the clamp opening crosswise of said elongated direction, said bars being approximately opposite each other, whereby when a raw shrimp is placed between said jaws with a shell knuckle between said bars, closing said jaws will cause said bars to crack said knuckle.

2. A clamp for processing fantail shrimp comprising two elongated jaws having means mounting them for relative approach and separation movement to receive the body of a shrimp between them with the shrimp body extending along the elongated direction of the jaws, holding means for securing a shrimp body in the clamp when the jaws are open, and a bar on each jaw extending into the clamp opening crosswise of said elongated direction, said bars being approximately opposite each other whereby when a raw shrimp is placed between said jaws with a shell knuckle between said bars and held there by said holding means, closing said jaws will cause said bars to crack said knuckle.

3. A clamp for processing fantail shrimp comprising two elongated jaws having means mounting them for relative approach and separation movement to receive the body of a shrimp between them with the shrimp body extending along the elongated direction of the jaws, and holding means for securing a shrimp body in the clamp when the jaws are open, said holding means including a pin having a pointed end for piercing said shrimp body near one end thereof, said pin adapted to pass through an opening in one of said jaws to hold the shrimp body by the knuckle located next to the tail, and a bar on each jaw extending into the clamp opening crosswise of said elongated direction, said bars being approximately opposite each other so that when said jaws are closed with a shell knuckle of a shrimp between them, the bars will crack the knuckle.

4. A clamp as recited in claim 1 having an open side adapted to expose the dorsal side of a shrimp held therein, a saw positioned to cut into the dorsal side of a shrimp so held approximately midway of its body and generally parallel to the jaws of said clamp, and means causing said saw to cut along a shrimp body and to leave said body with slight clearance of said jaws.

References Cited in the file of this patent

UNITED STATES PATENTS

| | | |
|---|---|---|
| 245,090 | Northway | Aug. 2, 1881 |
| 2,239,317 | Gibb | Apr. 22, 1941 |
| 2,574,044 | Lapeyre et al. | Nov. 6, 1951 |
| 2,660,754 | Roshko | Dec. 1, 1953 |
| 2,683,281 | Yanus et al. | July 13, 1954 |
| 2,716,776 | Streich et al. | Sept. 6, 1955 |
| 2,753,589 | Sloan | July 10, 1956 |
| 2,789,309 | Yanus et al. | Apr. 23, 1957 |